(12) United States Patent
Castonguay et al.

(10) Patent No.: US 12,397,684 B2
(45) Date of Patent: Aug. 26, 2025

(54) ELECTRIC POWERTRAIN AND METHOD FOR OPERATION OF SAID POWERTRAIN

(71) Applicant: Dana Heavy Vehicle Systems Group, LLC, Maumee, OH (US)

(72) Inventors: Sylvain Castonguay, Laval (CA); Frederic Delrieu, Montreal (CA); Martin Houle, Laval (CA); Tyler Stiene, Hamilton (CA); Joel Roeleveld, Hamilton (CA); Alexander Lebel, Laval (CA)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 650 days.

(21) Appl. No.: 17/659,814

(22) Filed: Apr. 19, 2022

(65) Prior Publication Data
US 2022/0348112 A1 Nov. 3, 2022

Related U.S. Application Data

(60) Provisional application No. 63/181,090, filed on Apr. 28, 2021.

(51) Int. Cl.
*B60L 58/33* (2019.01)
*B60K 1/00* (2006.01)
(Continued)

(52) U.S. Cl.
CPC ............... *B60L 58/33* (2019.02); *B60K 1/00* (2013.01); *B60K 1/04* (2013.01); *B60K 11/06* (2013.01); *B60L 1/003* (2013.01); *B60L 50/75* (2019.02); *B60L 53/22* (2019.02); *B60L 58/18* (2019.02); *B60L 58/26* (2019.02); *B60L 58/30* (2019.02); *B60L 58/40* (2019.02); *B60R 16/0238* (2013.01); *H01M 8/04007* (2013.01); *H01M 8/04302* (2016.02); *H01M 8/04303* (2016.02); *H01M 8/0432* (2013.01); *H01M 8/04626* (2013.01); *H01M 8/04955* (2013.01);
(Continued)

(58) Field of Classification Search
CPC . B60L 58/40; B60L 50/75; B60L 1/00; B60K 1/04
See application file for complete search history.

(56) References Cited

U.S. PATENT DOCUMENTS

| | | |
|---|---|---|
| 4,931,947 A | 6/1990 | Werth et al. |
| 6,448,535 B1 | 9/2002 | Ap |

(Continued)

FOREIGN PATENT DOCUMENTS

| | | |
|---|---|---|
| DE | 102019008255 A1 | 6/2020 |
| EP | 2581249 A1 | 4/2013 |
| JP | 2003257441 A | 9/2003 |

*Primary Examiner* — Rexford N Barnie
*Assistant Examiner* — Esayas G Yeshaw
(74) *Attorney, Agent, or Firm* — McCoy Russell LLP

(57) ABSTRACT

Methods and systems are provided for an electric vehicle powertrain. The vehicle system includes an electric distribution assembly with a junction box that is electrically coupled to a traction motor-generator and is designed to electrically coupled to, via separate circuits, a traction battery assembly and a hydrogen fuel cell assembly that is positioned behind a vehicle cab. In the system, the traction battery assembly is positioned vertically below the hydrogen fuel cell assembly.

17 Claims, 5 Drawing Sheets

(51) Int. Cl.

| | |
|---|---|
| *B60K 1/04* | (2019.01) |
| *B60K 11/06* | (2006.01) |
| *B60L 1/00* | (2006.01) |
| *B60L 50/75* | (2019.01) |
| *B60L 53/22* | (2019.01) |
| *B60L 58/18* | (2019.01) |
| *B60L 58/26* | (2019.01) |
| *B60L 58/30* | (2019.01) |
| *B60L 58/40* | (2019.01) |
| *B60R 16/023* | (2006.01) |
| *H01M 8/04007* | (2016.01) |
| *H01M 8/04302* | (2016.01) |
| *H01M 8/04303* | (2016.01) |
| *H01M 8/0432* | (2016.01) |
| *H01M 8/04537* | (2016.01) |
| *H01M 8/04955* | (2016.01) |
| *H01M 10/48* | (2006.01) |
| *H01M 10/613* | (2014.01) |
| *H01M 10/625* | (2014.01) |
| *H01M 16/00* | (2006.01) |
| *H01M 50/249* | (2021.01) |

(52) U.S. Cl.
CPC ......... *H01M 10/48* (2013.01); *H01M 10/613* (2015.04); *H01M 10/625* (2015.04); *H01M 16/006* (2013.01); *H01M 50/249* (2021.01); *B60K 2001/005* (2013.01); *B60K 2001/0405* (2013.01); *B60K 2001/0494* (2013.01); *B60L 2210/10* (2013.01); *B60L 2240/12* (2013.01); *B60L 2240/36* (2013.01); *B60L 2240/54* (2013.01); *H01M 2220/20* (2013.01); *H01M 2250/20* (2013.01)

(56) References Cited

U.S. PATENT DOCUMENTS

| | | | |
|---|---|---|---|
| 6,580,977 | B2 | 6/2003 | Ding et al. |
| 7,252,166 | B2 | 8/2007 | Kubusch et al. |
| 7,273,120 | B2 | 9/2007 | Tabata |
| 7,327,118 | B2 * | 2/2008 | Pant ............ H02P 1/18 318/807 |
| 7,434,611 | B2 | 10/2008 | Wunderlich et al. |
| 7,543,454 | B2 | 6/2009 | Harris |
| 7,810,595 | B2 | 10/2010 | Moran et al. |
| 8,027,759 | B2 | 9/2011 | Saeki et al. |
| 8,120,290 | B2 * | 2/2012 | King ............ B60L 7/16 180/65.21 |
| 8,148,952 | B2 | 4/2012 | Schaffnit |
| 8,347,645 | B1 | 1/2013 | Miller |
| 8,511,407 | B2 | 8/2013 | Jeon et al. |
| 8,602,141 | B2 | 12/2013 | Yee et al. |
| 8,822,093 | B2 | 9/2014 | Kim et al. |
| 9,205,834 | B1 * | 12/2015 | Uehara ............ B60W 20/50 |
| 9,895,999 | B2 | 2/2018 | Ohashi |
| 10,442,297 | B2 | 10/2019 | Brown et al. |
| 10,957,920 | B2 | 3/2021 | Sato et al. |
| 2006/0101645 | A1 | 5/2006 | Stone |
| 2010/0136379 | A1 * | 6/2010 | King ............ H02J 7/34 429/432 |
| 2011/0136026 | A1 | 6/2011 | Betts et al. |
| 2013/0226389 | A1 * | 8/2013 | Yamazaki ............ B60W 10/26 701/22 |
| 2014/0167712 | A1 * | 6/2014 | Kim ............ B60L 58/40 323/234 |
| 2014/0316679 | A1 * | 10/2014 | Nishida ............ F02D 41/20 701/104 |
| 2019/0221872 | A1 * | 7/2019 | Seo ............ B60L 50/75 |
| 2020/0185735 | A1 | 6/2020 | Kim et al. |
| 2021/0155224 | A1 | 5/2021 | McKibben et al. |
| 2021/0179176 | A1 | 6/2021 | Kim |
| 2023/0202281 | A1 * | 6/2023 | Lim ............ B60L 50/66 180/291 |
| 2024/0332576 | A1 * | 10/2024 | Okumura ............ H01M 8/0491 |

* cited by examiner

ELECTRIC POWERTRAIN AND METHOD FOR OPERATION OF SAID POWERTRAIN

CROSS-REFERENCE TO RELATED APPLICATION

The present application claims priority to U.S. Provisional Application No. 63/181,090, entitled "ELECTRIC POWERTRAIN AND METHOD FOR OPERATION OF SAID POWERTRAIN", and filed on Apr. 28, 2021. The entire contents of the above-listed application are hereby incorporated by reference for all purposes.

FIELD

The present description relates generally to methods and systems for an electric powertrain.

BACKGROUND

Electric powertrains have previous utilized either battery technology or fuel cells to provide electric energy for a traction motor. Both electric vehicle technologies do not generate hydrocarbon emissions during vehicle operation, which may provide an attractive alternative to vehicles with internal combustion engines when taking into account environmental factors during vehicle design.

US 2021/0155224 A1 to McKibben et al. discloses a heavy duty vehicle with a power distribution system that may include both a traction battery and a fuel cell system for additional energy storage. The vehicle further includes motors integrated into the rear tandem axle assembly that receive power from the distribution system. These motors are specifically used to provide mechanical power to the drive axles.

However, the inventors have identified several drawbacks with McKibben's heavy duty vehicle as well as other electric vehicles. McKibben's vehicle may present difficulties with regard to the layout and electrical connections in the vehicle. Consequently, the manufacture of McKibben's vehicle may be lengthy and complex and may pose impediments to efficient augmentation of the vehicle at later stages in manufacturing. Furthermore, integrating the motors into the rear axle assembly may present packaging constraints with regard to electric motor design and may present barriers to the use of a transmission in the powertrain. More generally, both fuel cell and battery electric vehicles may make compromises with regard to different vehicle characteristics, such as refueling or charging time, and battery or fuel cell packaging. Fuel cell vehicles may, for example, be used when energy filling time is favored while battery electric vehicles may be used when lower operating costs are desired. Certain customers may desire a different balance between these vehicle characteristics.

The inventors have recognized the abovementioned challenges and developed a vehicle system to at least partially overcome some of these issues. The vehicle system includes an electric distribution assembly with a junction box. The junction box is electrically coupled to a traction motor-generator. The junction box is designed to electrically coupled to, via separate circuits, a traction battery assembly and a hydrogen fuel cell assembly (e.g., a hydrogen range extender assembly) that is positioned behind a vehicle cab. In the system, the traction battery assembly is positioned vertically below the hydrogen fuel cell assembly. Positioning the traction battery assembly below the hydrogen fuel cell assembly allows the modularity of the system to be increased and specifically allows the fuel cells and the traction batteries to be efficiently and independently installed in the vehicle, if wanted. Further, by positioning the fuel cell assembly above the electrical energy storage assembly, the chance of a hydrogen gas leak interfering with the traction batteries is decreased. Further, positioning the electrical energy storage assembly below the fuel cell assembly decreases the space constraints that the traction batteries may impose on other vehicle systems such as the front axle and the side bars which are used for cab entry by the vehicle operator.

Further in one example, the hydrogen fuel cell assembly may include direct-current to direct-current (DC-to-DC) converters positioned between multiple fuel cells and ports that are in electronic communication with the junction box. In such an example, the fuel cell assembly may include contactors positioned between the DC-to-DC converters and the fuel cells. Positioning the DC-to-DC converters in the fuel cell assembly allows the system's modularity to be increased, by enabling fuel cell assemblies of different sizes to be used in the system without demanding modification to the traction battery assembly or the junction box and may further allow the system to use smaller electrical cabling, if wanted. The system's adaptability may be consequently increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A modular electric vehicle (EV) platform is described herein that allows the use of both traction batteries (or other electrical energy storage devices) as well as fuel cells to deliver power to a traction motor. To permit efficient incorporation of one or both of these propulsion assemblies, a junction box in an electrical distribution assembly. The junction box may further be electrically coupled to electric accessories that may be positioned in a cradle in front of the vehicle cab. The accessories may include a power steering inverter that is coupled to a power steering pump, an air brake compressor, a cabin heater, a cabin air conditioning (A/C) unit, an onboard charger, lights (e.g., cabin lights, headlights, and the like), communication systems, navigation systems, cabin heating systems, and the like.

The component layout on the EV system allows the system to be efficiently adapted to meet different end-user demands. For instance, the hydrogen fuel cell assembly is positioned behind the cab and the traction battery assembly is positioned vertically below the fuel cell assembly. Fuel cell degradation, such as hydrogen leakage, therefore may not interfere with the traction battery assembly. Consequently, countermeasures to prevent interference between the two assemblies, in the case of fuel cell degradation may be forgone, if wanted. Further, positioning the traction battery assembly behind the cab, may enable the system to impose less space constraints on other vehicle systems and may allow the battery assembly to be efficiently incorporated into the vehicle's chassis, if desired.

Figure 1:
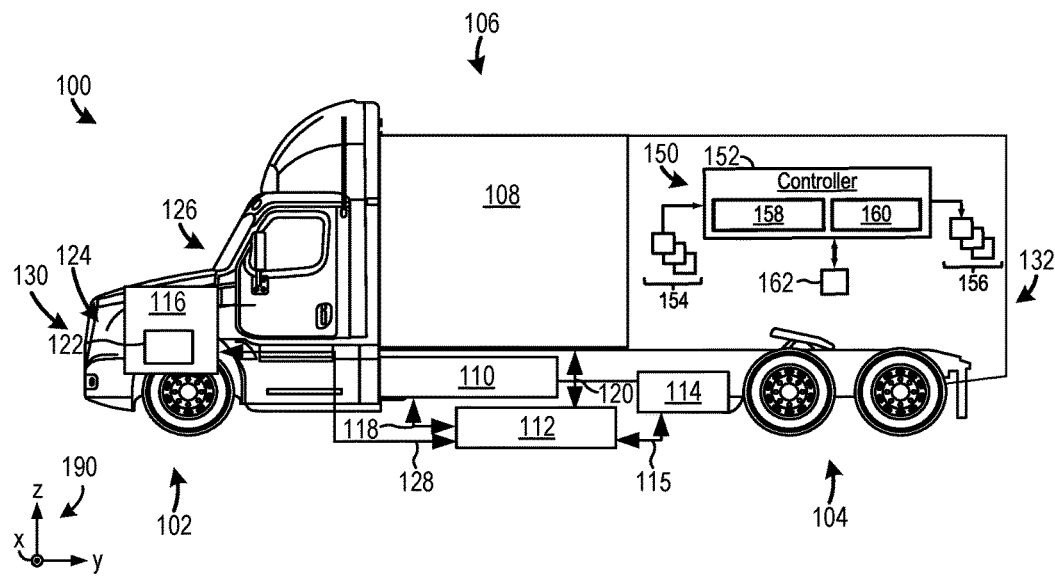
FIG. 1 shows an illustration of an electric vehicle (EV) with modular electric propulsion system components that are schematically depicted.

FIG. 1 illustrates an electric vehicle 100 (EV) with a modular architecture. Specifically, the vehicle may be an all-electric vehicle which does not include an internal combustion engine. The electric vehicle 100 is illustrated as a heavy duty vehicle (e.g., a semi-truck). A heavy duty vehicle may be classified as any vehicle with a gross vehicle weight rating (GVWR) equal to or greater than 14,969 kilograms (kg). However, the vehicle may take a variety of forms such as a light or medium duty vehicle, an on-road or off-road vehicle, and the like. As such, the vehicle may include multiple axles, one of which is a front axle 102 which may be steerable. A rear tandem axle 104 is further depicted in FIG. 1. At least one of the rear axles may be a drive axle, in one example. However, in other examples, numerous axle arrangements in the vehicle have been contemplated. For instance, the vehicle may include a different number of axles and/or axle types.

The electric vehicle 100 may have different electric propulsion assemblies which have a modular design. One or more of these assemblies may be included in a vehicle system 106 (e.g., an EV system). This modular design allows the propulsion unit configuration to be efficiently altered at a later stage in manufacturing than previous electric vehicle designs which have more design rigidity and are therefore less adaptable. Consequently, the vehicle's propulsion systems may be efficiently altered at a later stage in manufacturing to meet the demands of specific end users. Thus, the configuration of the electric propulsion system may be efficiently tailored to achieve a wider variety of end-use design goals, thereby expanding customer appeal.

The electric propulsion assemblies in the electric vehicle 100 may include a hydrogen fuel cell assembly 108, a traction battery assembly 110, an electric distribution assembly 112, a traction motor 114 (e.g., motor-generator), and/or an electric accessory assembly 116.

The hydrogen fuel cell assembly 108 and the traction battery assembly 110 are electrically coupled to the electric distribution assembly 112 as denoted via arrows 118, 120, respectively. As such, electrically energy may be transferred between these assemblies. To expound, the hydrogen fuel cell assembly 108 and the traction battery assembly 110 are coupled to the electric distribution assembly 112 in parallel. Connecting the hydrogen fuel cell assembly and the traction battery assembly to the electric distribution assembly in parallel permits the vehicle to be adapted for use as a hydrogen fuel cell vehicle (FCEV), a battery electric vehicle (BEV), or vehicle using both fuel cell and battery systems in tandem. In this way, the vehicle platform may be efficiently tailored for end-use design goals at a later stage in the manufacturing process, if desired. In the case of a vehicle using both fuel cell and battery assemblies, characteristics from both fuel cell and battery electric vehicles may be comingled to mitigate or in some cases avoid unwanted compromises between refueling/recharging characteristics and electric drive performance, for instance. For example, when the vehicle includes both the fuel cell and battery systems, the vehicle may use a wider infrastructure network for recharging or refueling. Consequently, the vehicle's applicability, range, and/or efficiency may be increased when both battery and fuel cell systems are incorporated in the electric vehicle 100.

The electric distribution assembly 112 is further electrically coupled to the traction motor 114 as denoted by arrows 115. A suitable traction motor may be used such as an alternating current (AC) motor that receives power from an inverter. It will be understood that the traction motor 114 is designed to deliver mechanical power to drive wheels. A transmission, gearbox, and/or other suitable powertrain components may be used to accomplish this power transfer functionality.

The traction battery assembly 110 may include one or more batteries and/or other suitable energy storage devices such as capacitor. The battery assembly 110 may further include a heater and contactors that allow the individual battery packs to be heated and selectively disconnected.

The vehicle system 106 may further include electric accessories 122 which may be positioned in a cradle 124 of the vehicle in front of the cab 126 and are electrically coupled to the electric distribution assembly 112, denoted by arrows 128. These electric accessories 122 may include a power steering inverter, an air brake compressor, a cabin heater, a cabin cooler, a power steering pump, an on board charger, and the like.

The vehicle may include a control system 150 with a controller 152. The controller 152 may receive signals from sensors 154 coupled to various regions of the vehicle 100. For example, the sensors 154 may include wheel speed sensors, battery temperature sensors, battery state of charge (SOC) sensor, accelerator pedal sensor, fuel cell voltage sensors, and the like. Upon receiving the signals from the various sensors, the controller processes the received signals, and employs various actuators 156 of vehicle components to adjust the components based on the received signals and instructions stored on the memory of controller. The controller may include a processor 158 and memory 160 that includes various circuits such as microprocessors, memory units, data buses, input-output ports, and the like. As such the memory of the controller may have instructions stored therein that, when executed by the processor, cause the controller to perform various methods and control techniques described herein. The memory may include known data storage mediums such as random access memory, read only memory, keep alive memory, combinations thereof, and the like. One or more input device(s) 162 (e.g., control pedal (e.g., accelerator and/or brake pedal), gear selector, ignition key, combinations thereof, and the like) may further be in electronic communication with the controller 152.

Figure 2:
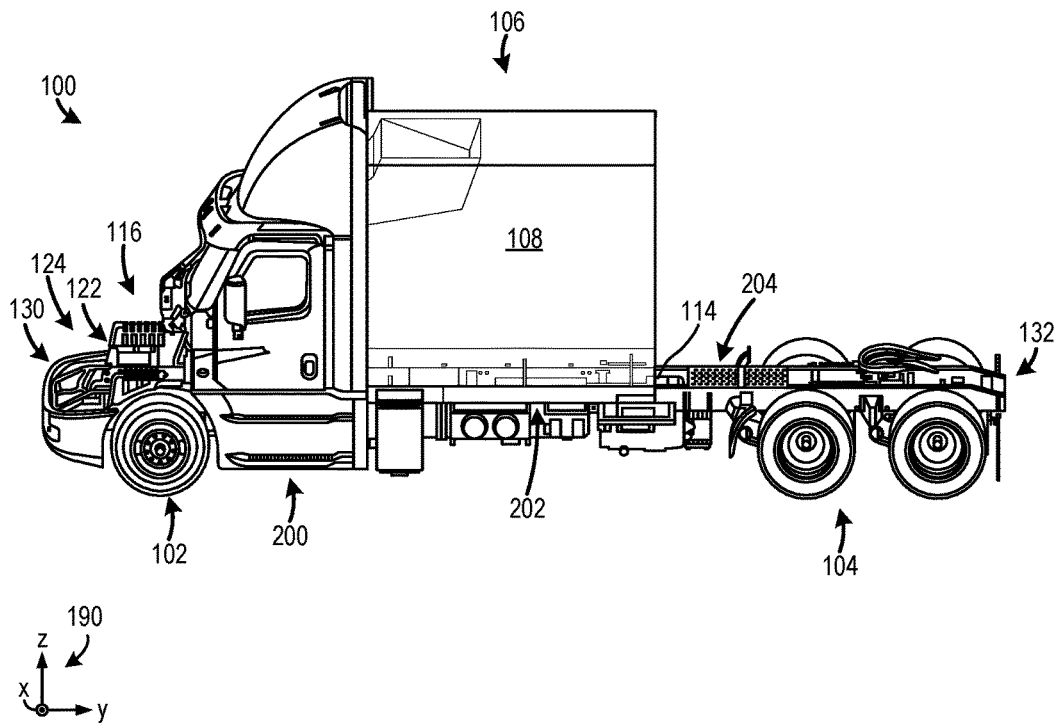
FIG. 2 shows an illustration of the EV, depicted in FIG. 1, with exemplary detailed illustrations of the electric propulsion system components.
Figure 3:
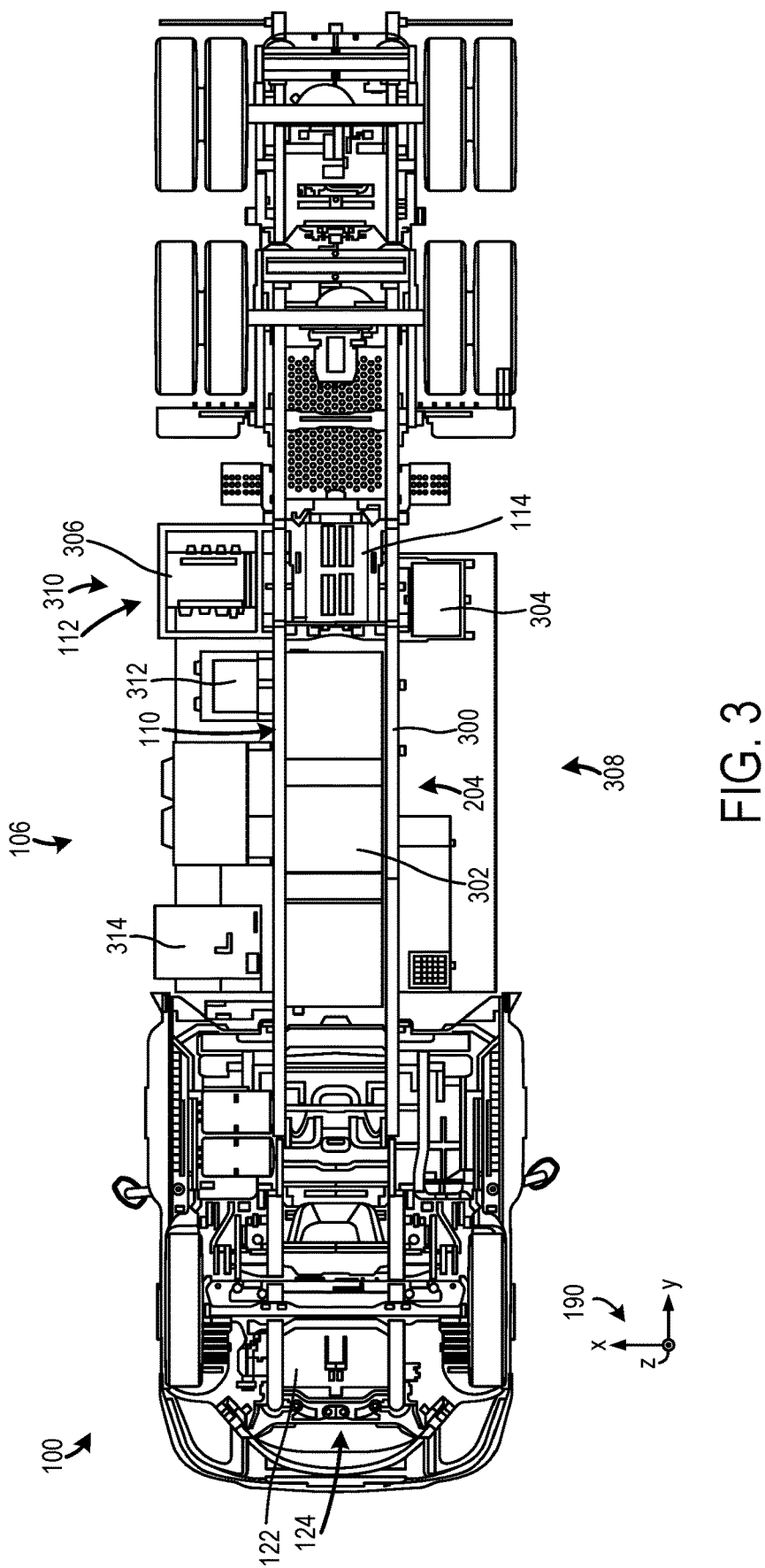
FIG. 3 shows a bottom view of the EV, depicted in FIG. 2.

An axis system 190 is provided in FIG. 1, as well as in FIGS. 2-3, for reference. The z-axis may be a vertical axis (e.g., parallel to a gravitational axis), the x-axis may be lateral axis (e.g., a horizontal axis), and/or the y-axis may be a longitudinal axis, in one example. However, the axes may have other orientations, in other examples. The terms in front and behind denote the relative position of a component along the longitudinal axis or an axis parallel to the y-axis. In this regard, a front side 130 and a rear side 132 of the vehicle are denoted in FIGS. 1 and 2.

FIG. 2 shows a detailed view of the vehicle 100 with exemplary illustrations of the vehicle system components such as the electric accessories 122 of the electric accessory assembly 116, the hydrogen fuel cell assembly 108, the electric distribution assembly 112, the traction motor 114, and the traction battery assembly 110. As shown, the electric accessories 122 are positioned in the cradle 124 in front of the cab 126. In this way, the accessories may be efficiently incorporated into the vehicle at a location that may not impose space constraints on other vehicle systems. It will be understood, that the cradle 124 may be positioned above the front axle 102.

The hydrogen fuel cell assembly 108 is positioned behind the cab 126 and in front of the tandem axle 104. In this way, the fuel cell assembly may be protected and is positioned in a location that may not interfere with the attachment or sizing of a trailer that may be coupled to the vehicle during freight transport.

The traction battery assembly 110 is positioned vertically below the hydrogen fuel cell assembly 108 (e.g., directly below the hydrogen fuel cell assembly and behind the cab). Further, the traction battery assembly 110 may be positioned behind side bars 200, thereby permitting the vehicle operator to more easily enter the cab when compared to electric vehicles that position battery packs directly below the cab. Still further, the traction battery assembly 110 may be incorporated into a section 202 of the chassis 204. Positioning the traction battery assembly 110 into the chassis may allow for increased protection of the batteries.

FIG. 3 shows a bottom view of the vehicle 100. The chassis 204 of the vehicle is again depicted which includes longitudinal frame rails 300 between which battery packs 302 in the traction battery assembly 110 are positioned. The traction motor 114 may further be positioned behind the battery packs 302 and between the longitudinal frame rails 300. A motor inverter 304 and the junction box 306 may be positioned on opposing lateral sides 308, 310 of the chassis 204. A battery s-box 312 in the electric distribution assembly 112 and/or an air compressor 314 may also be positioned on one lateral side of the chassis. In this way, vehicle system 106 may achieve more even weight distribution when compared to vehicles with other battery pack arrangements. The vehicle's handing performance may be consequently increased. FIG. 3 further shows the electric accessories 122 in the cradle 124.

Figure 4:
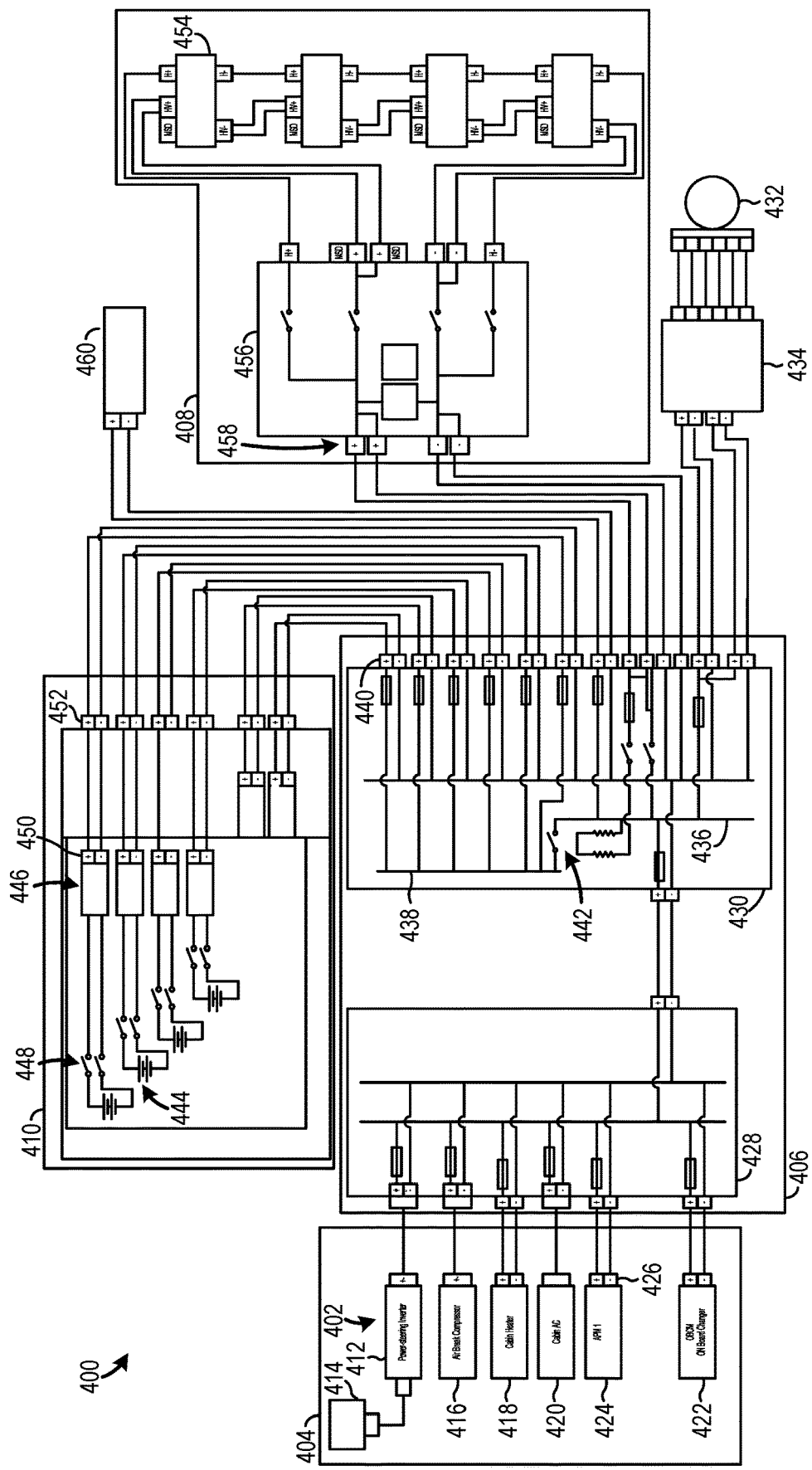
FIG. 4 shows a diagram of an electrical circuit in an electric vehicle system.

The electric vehicle system 106 shown in FIGS. 1-3 is highly adaptable and permits the hydrogen fuel cell assembly to be easily integrated into or removed from the vehicle. In this way, the vehicle may be efficiently altered at a later state in its manufacturing to accommodate for the end-use design targets of the customer. For instance, the vehicle may be efficiently adapted for use as a BEV or FCEV. FIG. 4 shows a circuit diagram of a vehicle system 400. It will be appreciated that the circuit diagram serves as an example of the circuitry in the vehicle system 106, depicted in FIGS. 1-3. The vehicle system 106 shown in FIG. 1 and the vehicle system 400 shown in FIG. 4 may therefore have at least some overlapping components that have a similar function and/or structure. Redundant description of these components is omitted for concision.

The vehicle system 400 may again include electric accessories 402 in an accessory assembly 404, an electric distribution assembly 406, a traction battery assembly 408, and a hydrogen fuel cell assembly 410. The electric accessories 402 may include a power-steering inverter 412 coupled to a power-steering pump 414, an air brake compressor 416, a cabin heater 418, a cabin AC unit 420, an on board charger 422, and/or an auxiliary power module 424. Each of the accessories include electrical ports 426 that enable connection between the accessories and a front junction box 428 (e.g., a front high voltage distribution box) included in the electric distribution assembly 406. The electric distribution assembly 406 may further include a rear junction box 430 (e.g., a rear high voltage distribution box). In some examples, the high voltage distribution boxes may distribute approximately 24 volts to the components which are electrically coupled thereto. However, other operating voltages have been contemplated.

The front junction box 428 is electrically coupled to the traction battery assembly 408 and the motor 432 and inverter 434 via bus 436 (e.g., a vehicle bus) within the rear junction box 430. Another bus 438 (e.g., a fuel cell bus) may be used to electrically couple and decouple the rear junction box 430 to the hydrogen fuel cell assembly 410. Each of these connections may be established via ports 440 in the junction box. The modularity of the system allows for a different front junction box to handle the vehicle accessories of other vehicle configurations while maintaining the same rear junction box configurations for the electric drive systems.

A fuel cell assembly contactor 442 may be positioned between the bus 436 and the bus 438 to allow the traction battery assembly 408 and motor 432 to be selectively electrically isolated from the fuel cell assembly 410.

The hydrogen fuel cell assembly 410 includes a plurality of fuel cells 444 that may be connected to direct-current to direct-current (DC-to-DC) converters 446 via contactors 448. To elaborate, a contactor may be positioned between each fuel cell and a DC-to-DC bus. The DC-to-DC converters 446 each include connectors 450 that are connected to ports 452 of the hydrogen fuel cell assembly 410. The use of the DC-to-DC converters allows for the use of smaller cabling throughout the vehicle system as opposed to a more centralized solution. The ports 452 are connected to the ports 440 in the junction box associated with the fuel cell bus 438. Further, the fuel cells 444 may be coupled in parallel to increase their output current. However, other fuel cell arrangement may be used, in other examples.

The traction battery assembly 408 may include a plurality of power packs 454. The power packs may be coupled in parallel and/or series. Further, a connection box 456 or other suitable electrical component arrangement may serve as an electrical interface between ports 458 of the traction battery assembly 408 and the power packs 454.

A battery chiller 460 may further be included in the traction battery assembly 408 or more generally in the vehicle system 400. The battery chiller 460 may be electrically coupled to the vehicle bus 436. The battery chiller 460 is designed to reduce the temperature of the battery packs.

Figure 5:
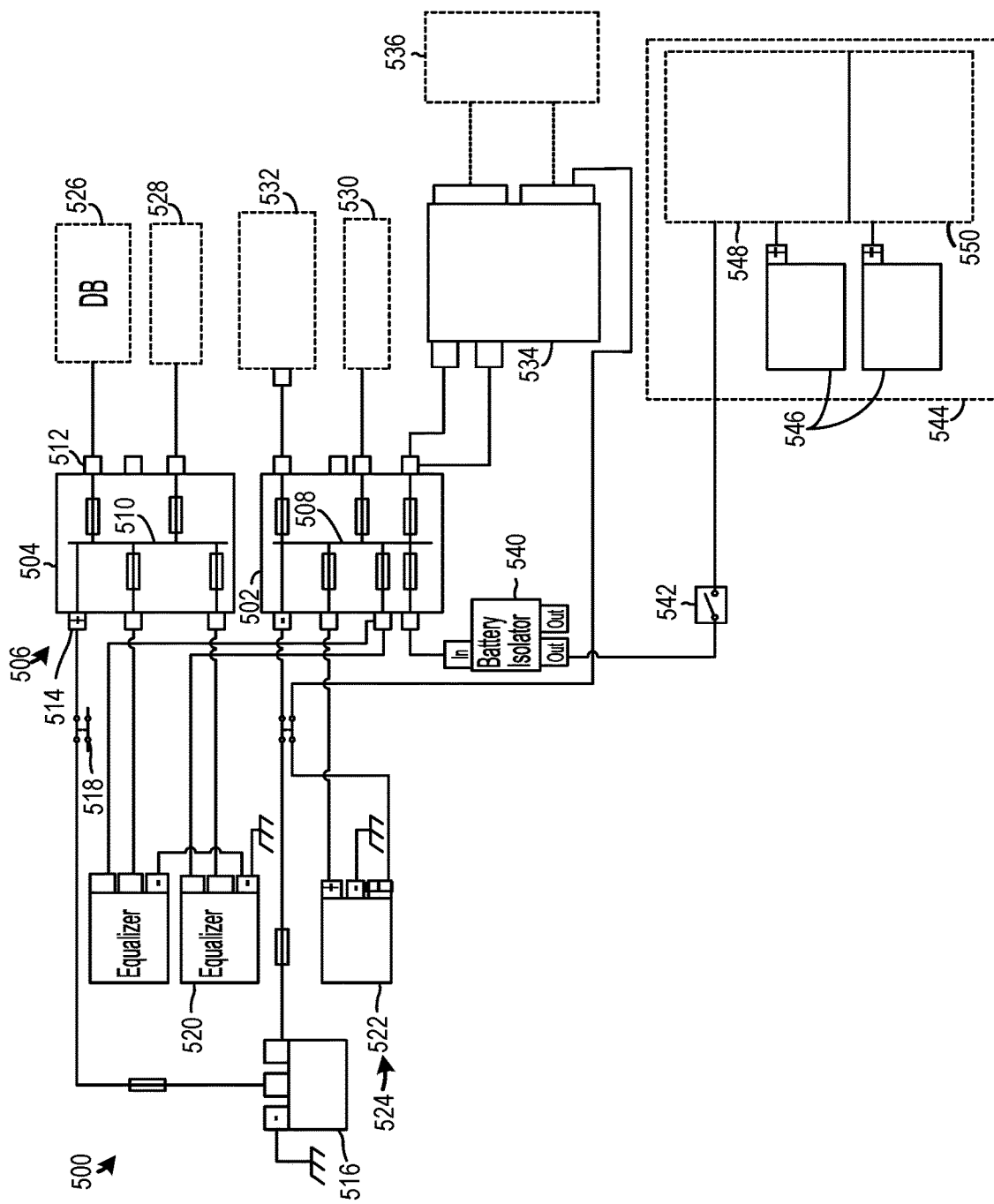
FIG. 5 shows another diagram of an electrical circuit in an electric vehicle system.

FIG. 5 shows another circuit diagram of a vehicle system 500. The vehicle system 500 has a split low voltage system that includes of a high voltage circuit 502 (e.g., 24V circuit) and a base vehicle voltage circuit 504 (e.g., 12V circuit) that may be included in an electric distribution assembly 506. Each of the high and low voltages circuits includes a bus 508 and 510, respectively. These buses are connected to load ports 512 and source ports 514. The split low voltage system allows high power low voltage accessories to be run at a higher voltage while still providing the appropriate voltage for the base vehicle to reduce losses and downsize cabling demands on higher power components.

The source ports 514 may be coupled to a high and low voltage battery array 516 and a battery disconnect 518 may be provided between the source ports and the battery array for battery disconnected functionality. Equalizers 520 that are designed to manage battery storage capacity may also be included in the vehicle system 500.

An auxiliary power module 522 that may be included in a fuel cell assembly 524 may be connected to the high voltage circuit 502. Further, the load ports 512 may be coupled to a distribution box 526 other low voltage loads 528, a high voltage pump 530, and other high voltage loads 532.

A multiplexed power distribution module 534 may be coupled to a load port of the high voltage circuit 502 and may distribute the high voltage to other loads 536 in the vehicle. A hydrogen fuel cell assembly 544 is further coupled to one of the source ports in the high voltage circuit 502 via a battery isolator 540 and a relay 542. The battery isolator 540 is designed to allow current to flow from the fuel cells in the fuel cell assembly 544 to the high voltage circuit 502 and prevent the current flow from the high voltage circuit to the fuel cells. Further, the relay 542 may be used to selectively disconnect the fuel cell assembly from the power distribution assembly when desired, such as during fuel cell assembly shut-down. The use of the battery isolator and the relay allows the fuel cell assembly's start-up and shutdown procedures to be carried out independently from the traction batteries, if so desired. Consequently, the system's adaptability is increased. The fuel cell assembly 544 may again include DC-to-DC converters 546 as well as high voltage distribution components 548 and a separate power supply 550 for the fuel cell fan array.

Figure 6:
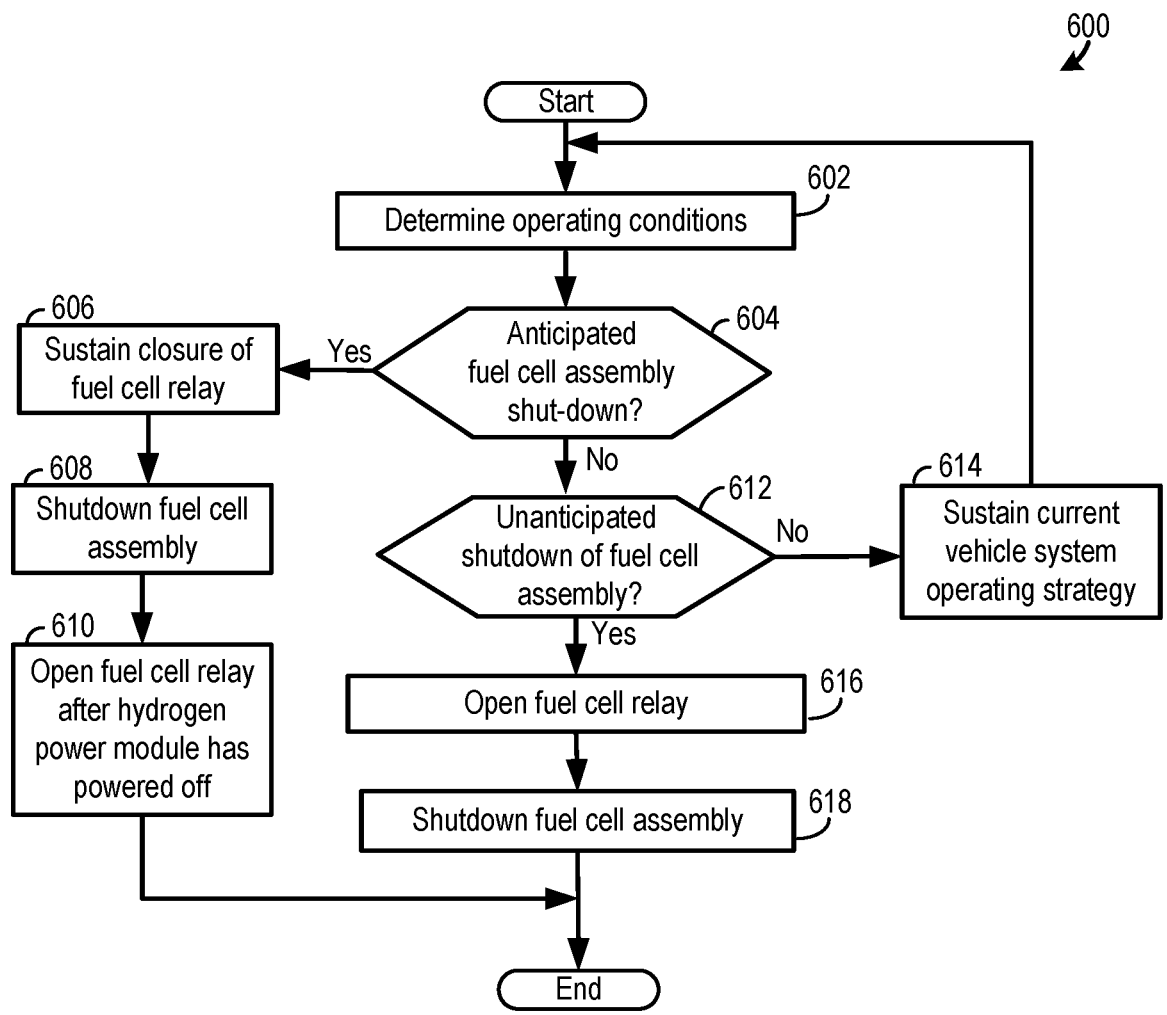
FIG. 6 shows a method for operation of a vehicle system with a fuel cell assembly.

FIG. 6 shows a method 600 for operation of a vehicle system. The method 600 may be used to operate any of the vehicle systems described herein with regard to FIGS. 1-5 or a combination of the vehicle systems. However, in other examples, the method may be used to operate other suitable vehicle systems. Further, the method may be implemented by a controller as instructions stored in memory that is executable by the controller.

At 602, the method includes determining operating conditions. The operating conditions may include but are not limited to vehicle speed, vehicle load, battery state of charge (SOC), hydrogen fuel cell assembly voltage, contactor state (e.g., open contactor or closed contactor), battery temperature, accessory load, key-on/off, motor speed/torque, and the like. These operating conditions may be measured via sensors and/or estimated via modelling.

At 604, the method judges if an anticipated fuel cell assembly shutdown should occur. This judgement may take into operating conditions such as key-on/off, vehicle speed, vehicle load, battery SOC, etc. For instance, the fuel cell assembly may be shutdown when the battery SOC is above a threshold value and the motor torque is below a threshold value.

If it is judged that an anticipated fuel cell assembly shutdown should occur (YES at 604) the method moves to 606, where the method includes sustaining closure of the fuel cell relay. In this way, the relay may remain closed until the fuel cell assembly is completely shutdown, thereby permitting the assembly to receive accessory power in the event of degradation (e.g., inoperability) of the hydrogen power module. Next at 608, the method includes shutting down the fuel cell assembly. Shutting down the fuel cell assembly may include shutting down the DC-to-DC converters and/or opening the contactors between the relays. Shutting down the fuel cell assembly may further include isolating hydrogen storage tanks that provide hydrogen to the fuel cells. Additionally, shutting down the fuel cell assembly may include placing the fuel cells in an unlocked state.

At 610, the method further includes opening the fuel cell relay after the hydrogen power module has powered off. In this way, the fuel cell relay may be closed until the fuel cell assembly can completely shut-down, thereby reducing the likelihood of component degradation in the assembly.

If it is judged that an anticipated fuel cell assembly shutdown should not occur (NO at 604) the method moves to 612, where the method judges if an unanticipated shutdown of the fuel cell assembly should occur. This judgement may take into account the voltage traveling from the fuel cells to the power distribution box, key position, and the like.

If it is judged that an unanticipated shutdown should not occur (NO at 612) the method moves to 614, where the method includes sustaining the current vehicle system operating strategy. For instance, both the fuel cell and traction battery assemblies may continue to operate and provide power to the electric distribution assembly.

Conversely, if it is judged that an unanticipated shutdown should occur (YES at 612) the method moves to 616. At 616, the method includes opening the fuel cell relay. Next at 618, the method includes shutting down the fuel cell assembly which may be similar to step 608.

The technical effect of the vehicle system operating methods described herein is to reduce the likelihood of fuel cell degradation when the fuel cell assembly is shut-down unexpectedly. Consequently, the longevity of the fuel cell assembly is increased.

The vehicle system described herein may further be designed to implement a start-up sequent for the fuel cell assembly. In one example, the start-up sequence includes connecting the hydrogen storage tanks to the fuel cells. Next the start-up sequence includes activating the DC-to-DC converters and performing a start-up sequence in the fuel cell modules. Next the start-up sequence includes transition the hydrogen fuel cell assembly to a running state when at least one fuel cell module is running.

FIGS. 2-3 are drawn approximately to scale. However, alternate component dimensions may be used, in other embodiments.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a vehicle system is provided that comprises an electric distribution assembly including a junction box that is electrically coupled to a traction motor-generator and is designed to electrically coupled to, via separate circuits, a traction battery assembly and a hydrogen fuel cell assembly that is positioned longitudinally behind a vehicle cab; wherein the traction battery assembly is positioned vertically below the hydrogen fuel cell assembly.

In another aspect, a heavy duty vehicle system is provided that, comprises an electric distribution assembly including a junction box that is electrically coupled to a traction motor-generator and is designed to electrically coupled to a traction battery assembly and a hydrogen fuel cell assembly; wherein the hydrogen fuel cell assembly that is positioned longitudinally behind a vehicle cab; wherein the traction battery assembly is positioned vertically below the hydrogen fuel cell assembly; and wherein the hydrogen fuel cell assembly includes a plurality of direct-current to direct-current (DC-to-DC) converters positioned between a plurality of fuel cells and ports that are in electronic communication with the junction box.

In yet another aspect, an electric vehicle system is provided that comprises an electric distribution assembly including a junction box that is electrically coupled to a traction motor-generator and is designed to electrically coupled to, via separate circuits, a traction battery assembly and a hydrogen fuel cell assembly that is positioned longitudinally behind a vehicle cab; wherein the traction battery assembly is positioned vertically below the hydrogen fuel cell assembly; and wherein the traction motor-generator is positioned longitudinally between a front axle and a rear tandem axle and is designed to deliver mechanical power to the rear tandem axle.

In any of the aspects or combinations of the aspects, the junction box may be electrically coupled to a plurality of electric accessories positioned in a cradle above the front axle and wherein the plurality of electric accessories may include one or more of a power steering inverter, an air brake compressor, a cabin heater, a cabin cooler, a power steering pump, and an on board charger.

In any of the aspects or combinations of the aspects, the hydrogen fuel cell assembly may include a plurality of direct-current to direct-current (DC-to-DC) converters positioned between a plurality of fuel cells and ports that are in electronic communication with the junction box.

In any of the aspects or combinations of the aspects, the vehicle system may further comprise a battery isolator and a relay positioned between the junction box and the hydrogen fuel cell assembly and configured to selectively permit electrical coupling between the hydrogen fuel cell assembly and the junction box; and a controller including non-transitory memory that when executed, during shutdown operation of the hydrogen fuel cell assembly, cause the controller to: open the relay.

In any of the aspects or combinations of the aspects, the electric vehicle system may be included in a heavy duty vehicle.

In any of the aspects or combinations of the aspects, the hydrogen fuel cell assembly may include a plurality of direct-current to direct-current (DC-to-DC) converters positioned between a plurality of fuel cells and ports that are in electronic communication with the junction box.

In any of the aspects or combinations of the aspects, the hydrogen fuel cell assembly may include a plurality of contactors positioned between the plurality of DC-to-DC converters and the plurality of fuel cells.

In any of the aspects or combinations of the aspects, the junction box may be positioned vertically below the hydrogen fuel cell assembly.

In any of the aspects or combinations of the aspects, the vehicle system may further include a battery isolator and a relay positioned between the junction box and the hydrogen fuel cell assembly and configured to selectively permit electrical coupling between the hydrogen fuel cell assembly and the junction box.

In any of the aspects or combinations of the aspects, the junction box may be electrically coupled to an electric accessory.

In any of the aspects or combinations of the aspects, the electric accessory may be positioned in a cradle in front of the vehicle cab.

In any of the aspects or combinations of the aspects, the vehicle system may be included in a heavy duty vehicle with three or more axles.

In any of the aspects or combinations of the aspects, the junction box may be electrically coupled to a plurality of accessories positioned in a cradle in front of the vehicle cab.

In any of the aspects or combinations of the aspects, the junction box may be electrically coupled to the plurality of accessories via a multiplexed power distribution module.

In any of the aspects or combinations of the aspects, the vehicle system may further comprise a battery isolator and a relay positioned between the junction box and the hydrogen fuel cell assembly and configured to: during a first condition, permit electrical coupling between the hydrogen fuel cell assembly and the junction box; and during a second condition, electrically isolate the hydrogen fuel cell assembly from the junction box.

In any of the aspects or combinations of the aspects, the traction battery assembly and the hydrogen fuel cell assembly may have different operating voltages.

In any of the aspects or combinations of the aspects, the traction motor-generator and the traction battery assembly may be positioned vertically below and/or with a vehicle chassis and the hydrogen fuel cell assembly is positioned vertically above the vehicle chassis.

In any of the aspects or combinations of the aspects, the plurality of fuel cells may be coupled in parallel.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other vehicle hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
an electric distribution assembly including a junction box that is electrically coupled to a traction motor-generator and is designed to electrically coupled to, via separate circuits, a traction battery assembly and a hydrogen fuel cell assembly that is positioned longitudinally behind a vehicle cab; and
a battery isolator and a relay positioned between the junction box and the hydrogen fuel cell assembly and configured to selectively permit electrical coupling between the hydrogen fuel cell assembly and the junction box;
wherein the traction battery assembly is positioned vertically below the hydrogen fuel cell assembly.

2. The vehicle system of claim 1, wherein the hydrogen fuel cell assembly includes a plurality of direct-current to direct-current (DC-to-DC) converters positioned between a plurality of fuel cells and ports that are in electronic communication with the junction box.

3. The vehicle system of claim 2, wherein the hydrogen fuel cell assembly includes a plurality of contactors positioned between the plurality of DC-to-DC converters and the plurality of fuel cells.

4. The vehicle system of claim 1, wherein the junction box is positioned vertically below the hydrogen fuel cell assembly.

5. The vehicle system of claim 1, wherein the junction box is electrically coupled to an electric accessory.

6. The vehicle system of claim 5, wherein the electric accessory is positioned in a cradle in front of the vehicle cab.

7. The vehicle system of claim 1, wherein the vehicle system is included in a heavy duty vehicle with three or more axles.

8. A heavy duty vehicle system, comprising:
an electric distribution assembly including a junction box that is electrically coupled to a traction motor-generator and is designed to electrically coupled to a traction battery assembly and a hydrogen fuel cell assembly; and
a battery isolator and a relay positioned between the junction box and the hydrogen fuel cell assembly and configured to:
during a first condition, permit electrical coupling between the hydrogen fuel cell assembly and the junction box; and
during a second condition, electrically isolate the hydrogen fuel cell assembly from the junction box;
wherein the hydrogen fuel cell assembly that is positioned longitudinally behind a vehicle cab;
wherein the traction battery assembly is positioned vertically below the hydrogen fuel cell assembly; and
wherein the hydrogen fuel cell assembly includes a plurality of direct-current to direct-current (DC-to-DC) converters positioned between a plurality of fuel cells and ports that are in electronic communication with the junction box.

9. The heavy duty vehicle system of claim 8, wherein the junction box is electrically coupled to a plurality of accessories positioned in a cradle in front of the vehicle cab.

10. The heavy duty vehicle system of claim 9, wherein the junction box is electrically coupled to the plurality of accessories via a multiplexed power distribution module.

11. The heavy duty vehicle system of claim 8, wherein the traction battery assembly and the hydrogen fuel cell assembly have different operating voltages.

12. The heavy duty vehicle system of claim 8, wherein the traction motor-generator and the traction battery assembly are positioned vertically below and/or with a vehicle chassis and the hydrogen fuel cell assembly is positioned vertically above the vehicle chassis.

13. The heavy duty vehicle system of claim 8, wherein the plurality of fuel cells are coupled in parallel.

14. An electric vehicle system, comprising:
an electric distribution assembly including a junction box that is electrically coupled to a traction motor-generator and is designed to electrically coupled to, via separate circuits, a traction battery assembly and a hydrogen fuel cell assembly that is positioned longitudinally behind a vehicle cab;
a battery isolator and a relay positioned between the junction box and the hydrogen fuel cell assembly and configured to selectively permit electrical coupling between the hydrogen fuel cell assembly and the junction box; and
a controller including non-transitory memory that when executed, during shutdown operation of the hydrogen fuel cell assembly, cause the controller to:
open the relay;
wherein the traction battery assembly is positioned vertically below the hydrogen fuel cell assembly; and
wherein the traction motor-generator is positioned longitudinally between a front axle and a rear tandem axle and is designed to deliver mechanical power to the rear tandem axle.

15. The electric vehicle system of claim 14, wherein:
the junction box is electrically coupled to a plurality of electric accessories positioned in a cradle above the front axle; and
the plurality of electric accessories include one or more of a power steering inverter, an air brake compressor, a cabin heater, a cabin cooler, a power steering pump, and an on board charger.

16. The electric vehicle system of claim 14, wherein the hydrogen fuel cell assembly includes a plurality of direct-current to direct-current (DC-to-DC) converters positioned between a plurality of fuel cells and ports that are in electronic communication with the junction box.

17. The electric vehicle system of claim 14, wherein the electric vehicle system is included in a heavy duty vehicle.

\* \* \* \* \*